Aug. 19, 1958 I. MARON 2,848,607

INFORMATION HANDLING SYSTEM

Filed Nov. 22, 1954 2 Sheets-Sheet 1

INVENTOR.
IRVING MARON

BY Morris B. Rabkin

ATTORNEY

INVENTOR.
IRVING MARON
BY Morris A. Rabkin
ATTORNEY 2,848,607

INFORMATION HANDLING SYSTEM

Irving Maron, Haddonfield, N. J., assignor to Radio Corporation of America, a corporation of Delaware Application November 22, 1954, Serial No. 470,296

13 Claims. (Cl. 250—27)

This invention relates to systems for checking errors in digital codes and particularly to electronic circuits that may be employed for such error checking.

In large-scale digital information handling systems, errors in the digital codes may occur. In order to detect the occurrence of such errors various error checking systems are employed. One such error checking system is the parity check code. In a parity check for binary codes, an extra digit is added to each binary code combination or number; such code combinations are hereinafter called "characters." The extra binary digit is a one or a zero digit to make the total number of one digits in a character always odd or always even in accordance with the convention that is chosen. Thus, if an even parity is used, an error is detected any time the number of binary ones in a character is odd.

It is an object of this invention to provide:

A new and improved apparatus for checking parity that is simple and reliable;

A new and improved electronic circuit for checking whether the number of one digits in a binary character is odd or even;

A new and improved electronic circuit for carrying out the logical operations involved in a parity check.

In one system for performing a parity check, a combination of binary signals that form a binary character is divided into a plurality of groups each of which has a plurality of signals. The oddness or the evenness of the number of one digits in each group is determined and signals denoting odd and even are produced in accordance with the result. The odd and even signals are formed in groups and the process repeated until a single odd or even signal is produced which is representative of the oddness or evenness of the number of one digits in the original character.

In accordance with this invention, a circuit is employed for determining the oddness or evenness of two signals. Two grid-controlled tubes have their cathodes connected together and to a common cathode resistor. A diode is connected between the grid of a first one of the tubes and a reference potential at the low-voltage terminal of the cathode resistor which in conjunction with an additional series resistor prevents the first tube grid from rising above the reference potential. Means is provided for deriving a voltage that is proportional to the average of direct input voltages and for applying the derived voltages to the tube grids. An output voltage of one type is produced if both input voltages are greater than or if both are less than a predetermined voltage, and an output voltage of another type is produced if one input voltage is greater than and the other less than the predetermined voltage.

The foregoing and other objects, the advantages and novel features of this invention, as well as the invention itself, both as to its organization and mode of operation, may be best understood when read in connection with the accompanying drawings in which like reference numerals refer to like parts, and in which.

Figure 1:
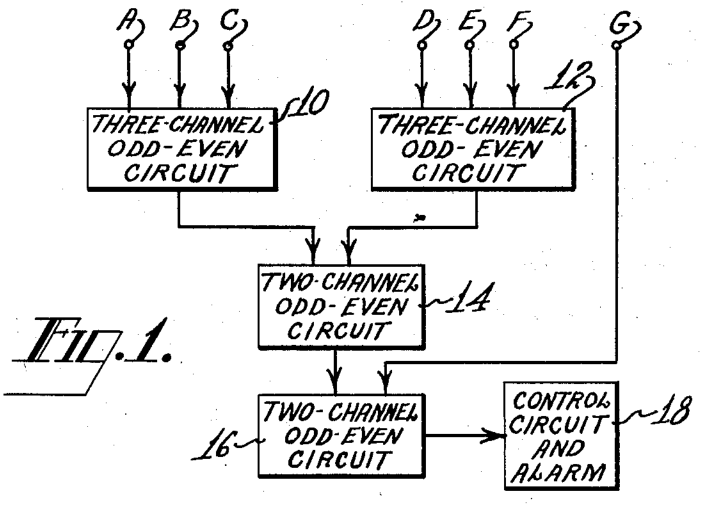
Figure 1 is a schematic block diagram of a parity check system.

In Figure 1 a system for checking the parity of a seven digit character is shown. The same principles apply whatever the number of digits in a character. Signals representing the first three digits, A, B, C of a character are applied to a three-channel odd-even circuit 10. The next three digits, D, E, F are applied to another three-channel odd-even circuit 12. Each of the circuits 10, 12 operates to produce "odd" and "even" signals, if the number of one digits in the group A, B, C, or D, E, F is odd and even, respectively. The outputs of the circuits 10, 12 are applied to a two-channel odd-even circuit 14 which operates to produce an "odd" signal if the two inputs are different, and an "even" signal if the two inputs are the same. The output of the two-channel circuit 14 is applied to another two-channel odd-even circuit 16 which also receives the seventh-digit signal G. The output of the second two-channel circuit 16 is applied to a control circuit 18 for operating an alarm.

If the outputs of both three-channel circuits 10, 12 are "even" signals, the output of the first two-channel circuit 14 is an "even" signal, which is representative of the even condition of all six digits A to F. If both inputs to the first two-channel circuit 14 are "odd" signals, the output of that circuit 14 is an "even" signal, which is again representative of the even condition of the digits A to F. However, if one of the inputs to the first two-channel 14 is an "odd" signal and the other is an "even" signal then the output of the circuit is an "odd" which is representative of the odd condition of the digits A to F. In a similar manner, the output signals of the second two-channel circuit 16 are representative of the odd-even condition of all seven digits A to G. If even parity is the convention that is followed, the last odd-even circuit 16 may be arranged to provide a low voltage level as the "even" signal and a high voltage level as the "odd" signal. The control circuit 18 may include a thyratron (not shown) that is fired by the high voltage "odd" signal. The thyratron, in turn, may energize a relay circuit (not shown) for initiating an alarm to indicate the error of an odd condition in the digits A to G.

Figure 2:
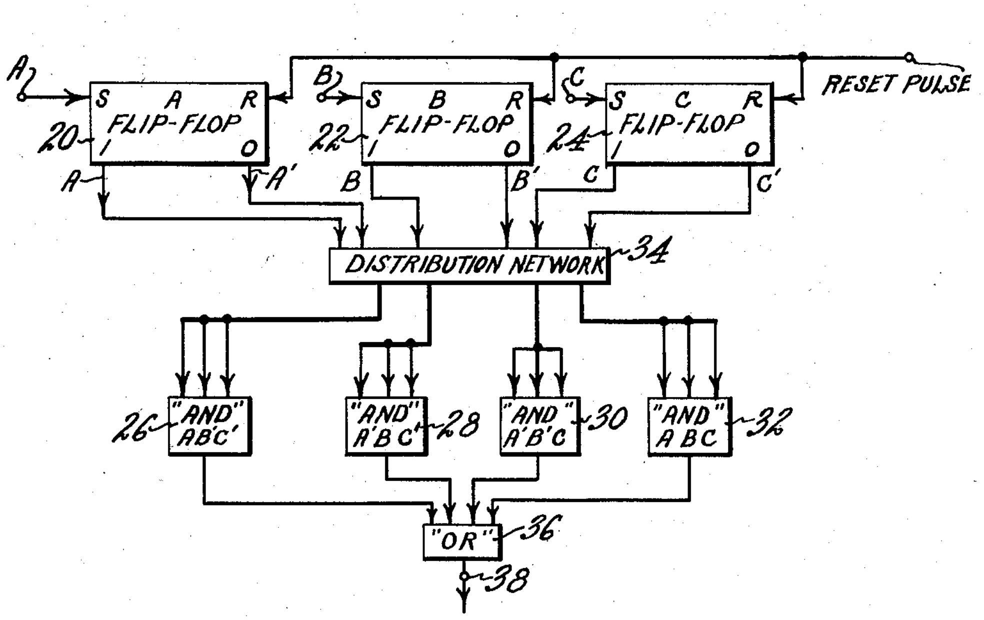
Figure 2 is a schematic block diagram of an odd-even circuit that may be employed in the system of Figure 1.

In Figure 2 a three-channel odd-even circuit is shown that may be employed in the system of Figure 1. It is assumed that the signals making up a character are in the form of a pulse and the absence of a pulse respectively representing the binary digits one and zero. The three signals, A, B, C of a character are applied to the set sides of different flip-flops 20, 22, 24, respectively. Each flip-flop is a binary trigger circuit having two input terminals designated S (set) and R (reset), and two output terminals designated "1" and "0." Application of a pulse to the S terminal sets the flip-flop with its 1-output established at a relatively low voltage level and its 0-output at a high voltage level. Application of a reset pulse to the R terminal resets the trigger circuit in the reverse condition. The 1-outputs of the flip-flops 20, 22, 24 are also designated A, B and C respectively, and the 0-outputs are designated A′, B′ and C′, respectively. Four "and" gates 26, 28, 30, 32 are provided, each of which is associated with a different one of the four possible odd conditions of the three inputs A, B and C. Thus, the first output gate 26 is associated with the odd condition of the digit A being a one and the digits B and C being zeros, and is represented in Figure 2 as A, B′, C′. Similarly, the second and third "and" gates 28 and 30 are associated with the conditions of the digits B and C, respectively, being ones. The fourth "and" gate 32 is associated with the condition of all three of the signals A, B and C being ones. Each of the "and" gates 26, 28, 30, 32 receives three inputs which are one of the outputs from each of the flip-flops. The connections from the flip-flop outputs to the "and" gate inputs are shown through a distribution network 34 for simplicity of illustration. This network may include appropriate amplifiers or buffers where required. The inputs of the first "and" gate 26 are respectively connected to the 1-output A of the first flip-flop 20, the 0-output B′ of the second flip-flop 22, and the 0-output C′ of the third flip-flop 24. The inputs to the other "and" gates 28, 30, 32 are connected to the flip-flop outputs referenced by the letters in each gate block. The outputs of all the "and" gates 26, 28, 30, 32 are connected through an "or" gate 36 or buffer to a common output terminal 38.

If the combination of signals A, B and C is even all of the "and" gates 26, 28, 30, 32 remain closed, and there is a first potential level at the output terminal 38 representing this even condition. If, for example, the first signal A is a one and the others are zero, the first "and" gate 26 conducts or is opened. There is a change in voltage level at the first gate outputs, which, in turn, produces a second voltage level at the output terminal 38 representing the odd condition. In a similar manner, if any other of the odd combinations of inputs occur one of the other "and" gates 28, 30, 32 is opened, and the odd signal voltage level is produced at the output terminal 38. Thus, two different voltage levels are produced at the output terminal 38 respectively representing an odd and even combination of ones in the input signals.

Appropriate forms of "and" gates and "or" gates that may be employed are well known in the art. One form of "and" gate (not shown) suitable for use with the static potential levels provided by the flip-flops includes three grid-controlled tubes whose anodes are connected in parallel to a common anode load resistor. The flip-flop outputs applied to the tube grids are so arranged so that all the tubes are cut off for the associated odd combination of flip-flop settings. Thus, the common anode potential is high when the associated odd combination of flip-flops are set and otherwise it is low. A suitable "or" gate (not shown) may include four grid-controlled tubes whose anodes are connected in parallel to a common anode load resistor. Each "and" gate output is applied to the grid of a different tube and render the associated tube conductive or cut-off when high or low, respectively.

Figure 3:
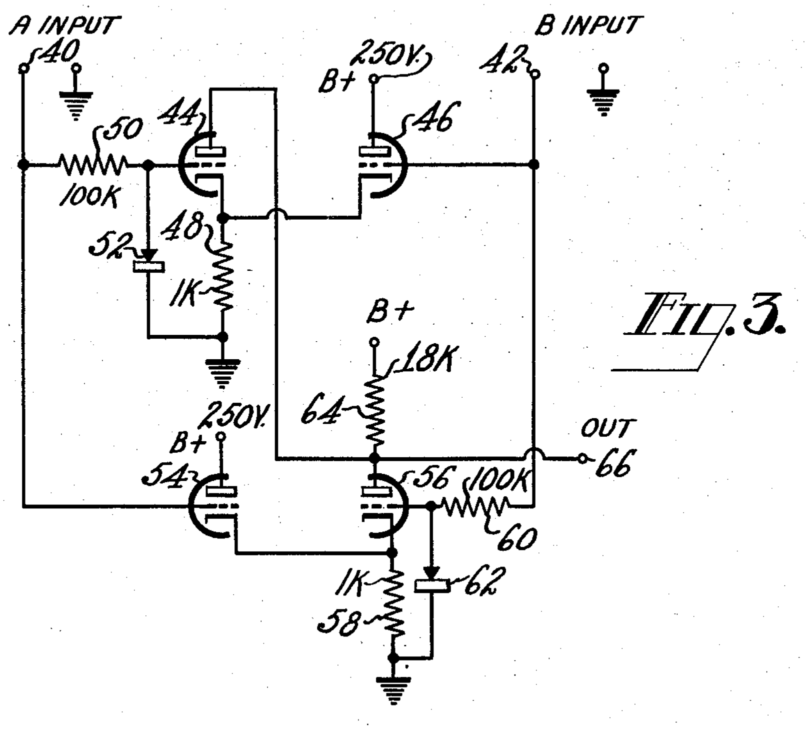
Figure 3 is a schematic circuit diagram of a two channel odd-even circuit embodying this invention.

In Figure 3 a two-channel odd-even circuit embodying this invention is shown. The input signals A and B at terminals 40 and 42 may take the form of voltage levels that are positive and negative with respect to a reference potential shown as ground and that respectively represent the conditions of even and odd or the binary digits 0 and 1. A first and a second triode 44, 46 have their cathodes connected together and to a terminal of a common cathode resistor 48, another terminal of which is maintained at ground potential. The A input terminal 40 is connected through a resistor 50 to the grid of the first tube 44. The first tube grid is connected through a diode 52 to ground, which diode 52 is poled to prevent the rise of grid voltage substantially above ground potential. The B input terminal 42 is connected to the grid of the second tube 46. A third and a fourth triode 54 and 56 are cathode coupled in the same manner to a common cathode resistor 58. The A input terminal 40 is connected to the grid of the third tube 54 and the B input terminal 42 is connected through a resistor 60 to the grid of the fourth tube 56. A diode 62 is connected between the grid of the fourth tube 56 and ground in the same manner as was the diode 52. The anodes of the first tube 44 and the fourth tube 56 are connected together and to a common anode resistor 64. An operating potential B+ is applied to the anodes of the other tubes 46, 54 and to the anode resistor 64. An output terminal 66 is connected to the anodes of the first and fourth tubes 44 and 56.

The specific component values indicated in Figure 3 (and in Figure 4, described below) are for the purpose of illustrating operative embodiments of the invention and are not to be construed as a limitation on the scope of the invention. An appropriate tube type is 5687, and an appropriate diode is IN38. Suitable input voltage levels for the components indicated are +30 volts and −30 volts.

If the A and B input voltages are both negative all four tubes are cut off and the output potential terminal 66 is at B+. If the A input voltage is positive and the B input is negative, the second and fourth tubes 46, 56 are cut off. The grid of the first tube 44 is held at approximately ground potential causing the tube 44 to conduct. Thus, current is drawn through the common anode resistor 64, which results in a relatively low output potential. With the reverse input voltages, namely, the B input 42 positive and the A input 40 negative, the fourth tube 56 conducts, which against results in the same low output potential. When both inputs 40, 42 are positive the second tube 46 and the third tube 54 both conduct raising the cathode potentials of the other tubes 44, 56 substantially above ground. Since the grids of the tubes 44, 56 are held at approximately ground potential, these tubes 44, 56 are cut off. Accordingly, the output voltage is high. Thus, when the inputs are different or odd, a low output voltage is produced, and when the inputs are the same or even, a high output voltage is produced.

The direct coupled circuit of Figure 3 may be employed with the circuit of Figure 2 in the parity check system of Figure 1. As indicated above, the circuit of Figure 3 may also be direct coupled which permits a parity check system that is direct coupled throughout.

Figure 4:
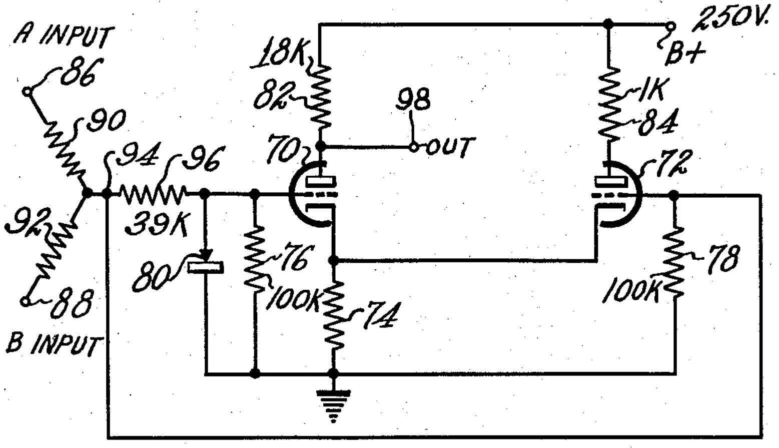
Figure 4 is a schematic circuit diagram of a modification of the circuit of Figure 3.

In Figure 4 a modification of the two-channel odd-even circuit of Figure 3 is shown. Two triodes 70, 72 are cathode coupled to a terminal of a common cathode resistor 74. Separate grid resistors 76, 78 are connected, respectively, between the grids of the tubes 70, 72 and ground potential. The grid of the first tube 70 is connected to ground through a diode 80 poled to prevent the rise of grid voltage above ground potential. A load resistor 82 is connected to the anode of the first tube 70, and a small resistor 84 may be connected to the anode of the second tube 72. Alternatively, the resistor 84 may be omitted and the second tube anode connected directly to B+. The A and B input terminals 86, 88 are connected to separate equal-value summing resistors 90, 92 which are joined at their other terminals. The junction 94 of the resistors 90, 92 is connected directly to the grid of the second tube 72 and connected through a resistor 96 to the grid of the first tube 70. An output terminal 98 is connected to the first tube 70 anode.

It will be noted in both Figure 3 and Figure 4 that the basic circuit formed by the two triodes having a common cathode resistor and a single anode load resistor in the anode circuit of one of the triodes is the well known differential amplifier. A complete description of differential amplifiers may be found in sec. 11—10 of "Vacuum Tube Amplifiers" by Valley and Wallman, vol. 18 of the M. I. T. Radiation Laboratory Series, published in 1948 by the McGraw-Hill Company, Inc.

The A and B input voltages are assumed to be either positive or negative and of the same amplitude. If one input is positive and the other is negative voltage at the junction 94 is the average of the two, namely, substantially ground potential. If both input voltages are positive, the junction voltage is positive; and if both are negative, the junction voltage is negative. When the junction voltage is negative both tubes 70, 72 are cut off, and the output voltage is high. When the junction voltage is positive, the second tube 72 conducts raising the cathode voltage of the first tube 70 well above ground to keep that tube 70 cut off. Thus, the output voltage is high when the inputs are the same or even. When the junction voltage is at ground potential, the grids of both tubes 70, 72 are at ground potential. The first tube cathode voltage is only slightly above ground, and that tube 70 conducts. Thus, a relatively low output voltage is produced at terminal 98 representing the odd condition. Thus, two different output voltages are produced respectively representing the odd and even condition of the inputs.

It is seen that new and improved apparatus for carrying out the logical operations involved in a parity check is provided. The apparatus may be used for determining whether the number of one digits represented by a plurality of binary signals is odd or even. The apparatus is simple and reliable and is especially suitable for direct current operation.

What is claimed is:

1. An electronic circuit having two input terminals and an output terminal for producing an output signal voltage of one type when the signal voltages at said input terminals are each greater than or are each less than a reference potential, and for producing an output signal voltage of another type when the signal voltage at one of said input terminals is greater than and the signal voltage at the other of said input terminals is less than said reference potential comprising a first and a second electron control device each having anode, cathode, and control electrodes, a common cathode impedance coupled at one terminal to said cathodes, input means including a first input terminal for coupling an input signal voltage greater or less than said reference potential to said first device, said input means including a second input terminal for coupling a second input signal voltage greater or less than said reference potential to said second device, means coupled between said first device control electrode and another terminal of said impedance for preventing the voltage at said first device control electrode from rising substantially above the voltage at said another impedance terminal, and means connected to said first device anode for deriving output signals.

2. An electronic circuit as recited in claim 1 wherein said means coupled between said first device control electrode and said another impedance terminal includes a unilateral impedance connected with its forward impedance directed from said first device control electrode to said another terminal.

3. An electronic circuit as recited in claim 1 wherein said input means includes first and second input terminals for receiving different input voltages, and means for deriving from said input voltages three different voltage signals that are respectively substantially equal to, greater than, and less than a predetermined reference potential accordingly as one and the other of said input terminal voltages are less than and greater than, both greater than, and both less than a predetermined reference potential respectively.

4. An electronic circuit as recited in claim 1 wherein said input means includes first and second input terminals for receiving different input voltages, means for deriving a voltage proportional to the average of the input voltages received simultaneously at said input terminals, and means for applying said proportional voltage to both of said control electrodes.

5. An electronic circuit comprising a first and a second electron control device each having anode, cathode and control electrodes, a common cathode resistor coupled at one terminal to said cathodes, means for applying a reference potential to another terminal of said resistor, a diode having an anode connected to said first device control electrode and a cathode connected to said reference potential means, a load resistor connected to said first device anode, a resistor connected at one terminal to said first device control electrode, and input means for applying the same signal voltages to another terminal of said last-mentioned resistor and to said second device control electrode.

6. An electronic circuit as recited in claim 5 wherein said input means includes a plurality of input terminals, and means for deriving said signal voltages proportional to the average of the input voltages received at said input terminals.

7. An electronic circuit as recited in claim 6 wherein said average voltage deriving means includes a plurality of summing resistors connected to a common terminal.

8. An electronic circuit as recited in claim 5 wherein said circuit is direct coupled throughout.

9. An electronic circuit comprising a first and a second electron control device each having anode, cathode and control electrodes, a common cathode impedance coupled at one terminal to said cathodes, input means including a first input terminal for coupling an input signal voltage greater or less than said reference potential to said first device, said input means including a second input terminal for coupling a second input signal voltage greater or less than said reference potential to said second device, means for providing a reference potential, another terminal of said cathode impedance being coupled to said reference potential means, means coupled between said first device control electrode and said reference potential means for preventing a rise of voltage at said first device control electrode substantially above said reference potential, and means including a load impedance coupled to said first device anode for deriving output signals.

10. An electronic coincidence circuit for detecting coincidence between a first signal and a second signal comprising a differential amplifier having a first input, a second input, and an output inversely responsive to said first input, a linear network input means for applying said signals to said first and said second differential amplifier inputs, a point of reference potential, and means for preventing the voltage at said first differential amplifier input from rising substantially above the voltage at said point of reference potential.

11. An electronic coincidence circuit for detecting when a first and a second input signal each have the same voltage amplitude and polarity with respect to a point of reference potential, said circuit comprising a differential amplifier having a first input, a second input, and an output inversely responsive to said first input, means for deriving a signal proportional to the average of said first and said second input signals, means for applying said averaged signals to both said first and said second inputs, and means for preventing the voltage at said first input from rising substantially above the voltage at said reference potential.

12. An electronic coincidence circuit for detecting when a first and a second input signal each have the same voltage amplitude and polarity with respect to a point of reference potential, said circuit comprising a differential amplifier having a first input, a second input, and an output inversely responsive to said first input, means for deriving signals proportional to the average of said first and said second input signals, said average voltage deriving means including a plurality of summing resistors connected to a common terminal, means for applying said averaged signals to both said first and said second inputs, and means for preventing the voltage at said first input from rising substantially above the voltage at said reference point.

13. An electronic coincidence circuit for detecting when a first and a second input signal each have the same voltage amplitude and polarity with respect to a point of reference potential, said circuit comprising a differential amplifier having a first input, a second input, and an output inversely proportional to said first input, means for deriving signals proportional to the average of said first and said second input signals, said average voltage deriving means including a plurality of summing resistors connected to a common terminal, linear network means for applying said averaged signals to said first and said second inputs, said linear network means including a resistor serially connected to said first input, and means for preventing the voltage at said first input from rising substantially above the voltage at said reference point.

References Cited in the file of this patent

UNITED STATES PATENTS

| | | |
|---|---|---|
| 2,401,779 | Swartzel, Jr. | June 11, 1946 |
| 2,632,845 | Goldberg | Mar. 24, 1953 |
| 2,658,180 | De Boisblanc | Nov. 3, 1953 |
| 2,702,854 | Woods | Feb. 22, 1955 |